(No Model.)
W. A. FRIES.
SPOOL.
No. 335,749.  Patented Feb. 9, 1886.
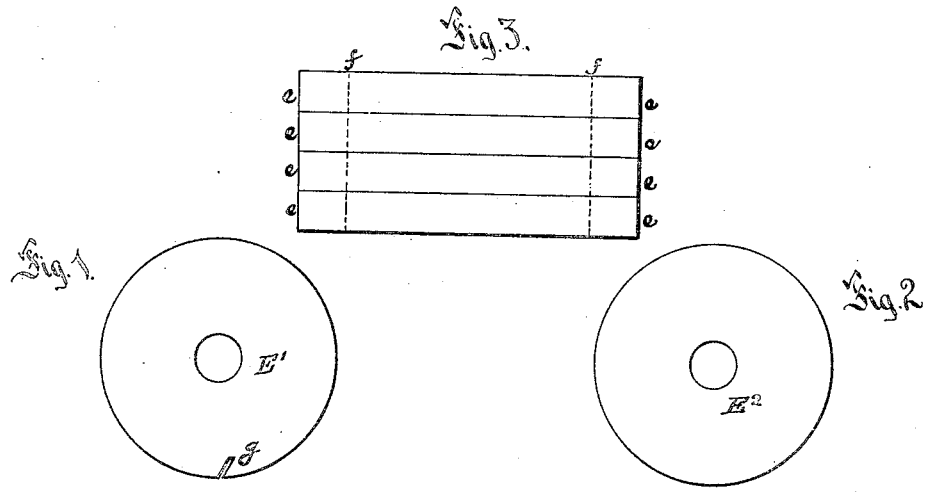
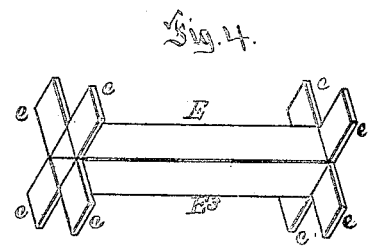
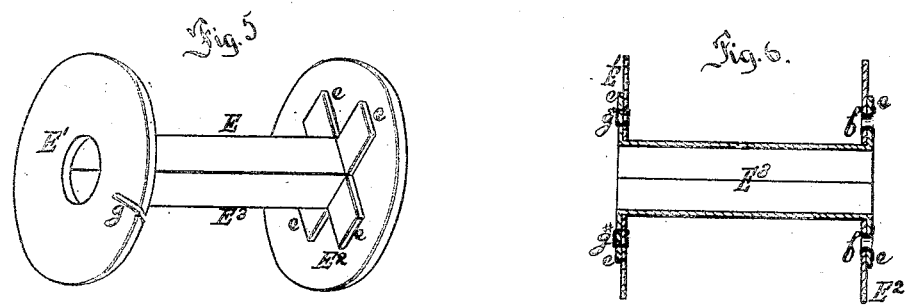
WITNESSES:
Joseph L. Levy
John J. Cauldwell
INVENTOR
Wm. Armstrong Fries.
BY Phillips Abbott
his ATTORNEY

UNITED STATES PATENT OFFICE.

WILLIAM ARMSTRONG FRIES, OF PHILADELPHIA, PA., ASSIGNOR TO THE H. W. JOHNS MANUFACTURING COMPANY, OF NEW YORK, N. Y.

SPOOL.

SPECIFICATION forming part of Letters Patent No. 335,749, dated February 9, 1886.

Application filed September 9, 1882. Serial No. 71,418. (No model.)

*To all whom it may concern:*

Be it known that I, WILLIAM ARMSTRONG FRIES, of the city and county of Philadelphia, and State of Pennsylvania, have invented certain new and useful Improvements in Spools Adapted for Use upon Spindles in the Operations of Twisting and Winding Threads, Yarns, Twines, and Cords; and I do hereby declare the following to be a full, clear, and exact description thereof, so as to enable others skilled in the art to make and use the said invention.

The invention consists of a light and cheaply-made spool formed of a prismatic hollow barrel made from paper, card-board, or other sheet material, combined with heads attached thereto by projecting ears or flanges formed on the barrel and bent at right angles thereto.

I will now proceed to describe fully and particularly the said invention, referring in so doing to the drawings annexed, and the letters of reference marked thereon.

The same letters indicate the same parts in all the figures.

Figure 1 illustrates one of the disks which form the heads of the spool, showing the notch for the retention of the end of the yarn. Fig. 2 illustrates the other disk, which forms the other head of the spool. Fig. 3 illustrates the method of scoring the stock for the barrel of the spool. Fig. 4 illustrates the barrel of the spool after having been folded and the flange-pieces bent at right angles to the band for application to the end pieces. Fig. 5 illustrates a completed spool. Fig. 6 illustrates the method of uniting the heads to the barrels by the employment of eyelets and paper-fasteners.

E is a spool, preferably made of paper, pasteboard, or straw-board, and consists of two heads, E' and E², united by a barrel or body, E³. The several parts of the spool E are shown in the several figures of the drawings as cut out and separate from each other. The heads E' and E² are simple disks of pasteboard, circular in form, and having central circular openings for the reception of the spindle by which the spools are turned on the machine.

The shaft or barrel of the spool E³ is made from a flat piece of pasteboard in the form of a parallelogram, as shown in Fig. 3, which has scorings *e* cut partly through it on the lines of the angles of the seams or corners of the prism, and with scoring *f* at right angles thereto on the opposite side, and it is slit or cut entirely through from the ends on the line of the lengthwise scorings up to the transverse scorings, so as to be readily bent in the form indicated by Fig. 4.

When the shaft E is formed as shown in Fig. 4, the heads E' and E² are applied to it either with eyelets or with wire paper-fasteners or staples passing through the flanges *e* of the barrel, and also through the heads; but I prefer to attach them by glue or cement.

At Fig. 6 is illustrated the method of uniting the heads and the barrel by means of eyelets and paper-fasteners.

The eyelets are seen at the right-hand end of the figure at *f*, and the wire paper-fasteners or staples are seen at the left-hand end of the same figure at *g*. In this figure the heads are shown as placed inside of the flanges *e*, instead of outside thereof, as in the other figures.

With the heads attached the spools present the appearance shown in Fig. 5. A notch, *g'*, is cut in the head of the spool, as shown in said figure, into which the yarn or cord is engaged when it is desired to prevent the cord from untwisting or unwinding from the spool E.

Spools made as above described are extremely light, sufficiently strong, of larger capacity, and of lower cost than those heretofore made, and are useful in transporting yarns, twines, cords, threads, and packings, and for avoiding waste in handling such goods in consumption and during retail sales.

I am aware that spools have been made wherein a shaft produced by winding and cementing or pasting paper rolled upon itself into cylindric form was united to heads of paper or pasteboard, and this, therefore, I do not claim; but

What I claim is—

1. The spool E, consisting of disks of pasteboard, E′ and E², or other equivalent sheet material, united by a prismatic barrel, E³, constructed and attached thereto substantially as shown and described.

2. The barrel for a winding-spool, consisting of a piece of pasteboard or other equivalent material scored lengthwise, whereby the barrel may be folded in prismatic form, and also scored crosswise, whereby the flange-like ears may be bent outwardly to unite the band to the head thereof, substantially as and for the purposes set forth.

WM. ARMSTRONG FRIES.

Witnesses:
J. DANIEL EBY,
LINN WHEELER.